(12) United States Patent
Brewer et al.

(10) Patent No.: US 12,480,559 B2
(45) Date of Patent: Nov. 25, 2025

(54) ROTARY DAMPER

(71) Applicant: Claverham Limited, Solihull (GB)

(72) Inventors: Paul Brewer, Bristol (GB); Reg Raval, Yatton (GB); Suat Bekircan, North East Somerset (GB)

(73) Assignee: CLAVERHAM LIMITED, Solihull (GB)

( * ) Notice: Subject to any disclaimer, the term of this patent is extended or adjusted under 35 U.S.C. 154(b) by 735 days.

(21) Appl. No.: 16/679,535

(22) Filed: Nov. 11, 2019

(65) Prior Publication Data

US 2020/0200231 A1 Jun. 25, 2020

(30) Foreign Application Priority Data

Dec. 19, 2018 (EP) .................................... 18214226

(51) Int. Cl.
  *F16F 9/14* (2006.01)
  *B64C 27/00* (2006.01)
  (Continued)

(52) U.S. Cl.
  CPC ............ *F16F 9/145* (2013.01); *B64C 27/001* (2013.01); *F16F 9/3207* (2013.01); *F16F 9/38* (2013.01); *F16F 9/437* (2013.01); *F16F 9/58* (2013.01); *B64C 2027/003* (2013.01); *F16F 2222/12* (2013.01); *F16F 2224/02* (2013.01); *F16F 2224/0208* (2013.01);
  (Continued)

(58) Field of Classification Search
  CPC .. F16F 9/145; F16F 9/3207; F16F 9/38; F16F 9/437; F16F 9/58; F16F 2222/12; F16F 2224/02; F16F 2224/0208; F16F 2224/0291; F16F 2230/06; F16F 2232/02; F16F 2226/048; B64C 27/001; B64C 2027/003
  See application file for complete search history.

(56) References Cited

U.S. PATENT DOCUMENTS 1,815,639 A * 7/1931 Wilkin ...................... F16D 3/80
    464/28
2,004,752 A * 6/1935 Fox ........................ F16F 9/145
    188/278

(Continued)

FOREIGN PATENT DOCUMENTS

DE       1911285 A1    9/1970
DE  102013204588 A1    9/2014

OTHER PUBLICATIONS

Extended European Search Report for International Application No. 18214226.5 dated Jun. 19, 2019, 10 pages.

*Primary Examiner* — Robert A. Siconolfi
(74) *Attorney, Agent, or Firm* — CANTOR COLBURN LLP

(57) ABSTRACT

A rotary damper comprising a fixed structure, a rotor configured to rotate about an axis (R-R), and two opposing bellows. The bellows each extend between the rotor and the fixed structure and are attached thereto. The bellows each define a chamber for holding hydraulic fluid and are configured to expand and contract as the rotor rotates. The damper further comprises a damping orifice extending through the rotor or the fixed structure. The bellows are sealingly engaged around the damping orifice and the damping orifice permits fluid communication between the chambers defined by the bellows.

11 Claims, 5 Drawing Sheets

(51) Int. Cl.
   *F16F 9/32*     (2006.01)
   *F16F 9/38*     (2006.01)
   *F16F 9/43*     (2006.01)
   *F16F 9/58*     (2006.01)

(52) U.S. Cl.
   CPC . *F16F 2224/0291* (2013.01); *F16F 2226/048* (2013.01); *F16F 2230/06* (2013.01); *F16F 2232/02* (2013.01)

(56) References Cited

U.S. PATENT DOCUMENTS

| | | | |
|---|---|---|---|
| 2,286,516 A | | 6/1942 | Swanson |
| 3,155,019 A | | 11/1964 | Stiglic et al. |
| 3,680,982 A | * | 8/1972 | Jacobellis ............. F15B 15/103 |
| | | | 92/92 |
| 3,731,599 A | * | 5/1973 | Allen ........................ F03C 7/00 |
| | | | 92/125 |
| 3,977,648 A | * | 8/1976 | Sigmon ................ F15B 15/103 |
| | | | 92/39 |
| 4,299,583 A | * | 11/1981 | Kraft ....................... F16H 7/129 |
| | | | 474/110 |
| 4,712,780 A | * | 12/1987 | Ficht ................. B62D 55/1125 |
| | | | 280/124.13 |
| 4,815,574 A | * | 3/1989 | Taylor ...................... F16F 9/361 |
| | | | 188/269 |
| 6,098,765 A | | 8/2000 | Kato et al. |
| 7,628,258 B2 | * | 12/2009 | Athanasiou ............ B62D 7/224 |
| | | | 188/316 |
| 9,841,061 B2 | * | 12/2017 | Bachmaier ............ F16F 15/023 |
| 2006/0186587 A1 | * | 8/2006 | Mintgen ................... F16F 9/54 |
| | | | 267/70 |
| 2018/0135717 A1 | | 5/2018 | Fox et al. |

\* cited by examiner

ROTARY DAMPER

FOREIGN PRIORITY

This application claims priority to European Patent Application No. 18214226.5 filed Dec. 19, 2018, the entire contents of which is incorporated herein by reference.

TECHNICAL FIELD

This disclosure relates to a rotary damper. This disclosure also relates to an actuator, a control surface actuation system for an aircraft, and a method of damping rotary motion.

BACKGROUND

Rotary dampers are well-known in the art and can be used, for example, to damp the motion of an actuator. For instance, the rotary damper can be used to damp sharp movements caused by a sudden loss of drive from the actuator or to damp any unintended movements (i.e. "flutter") that may occur when the actuator is not actively being driven. In one particular example, such rotary dampers may be used in conjunction with an actuator for driving an aircraft control surface. As known in the art, however, rotary dampers may also be used in many other applications; for instance, in vehicular suspension systems, such as disclosed in U.S. Pat. No. 6,098,765.

FIGS. 1A and 1B show generally a known arrangement of a rotary damper 10. The rotary damper 10 comprises an inner rotor 12 enclosed in an outer housing 14. The housing 14 is sealingly engaged with a first and second end plates 11 via seals 11a, 11b. The rotor 12 includes a shaft 12a that extends axially and rotates about an axis X-X and a projection 12b extending radially from the shaft 12a. The shaft 12a is supported for rotation within the end plates 11 and the housing 14 by a scraper 13a, a seal 13b and bearings 15a, 15b. The outer housing 14 also encloses a static end stop 16 attached thereto that is configured to mechanically interact with the rotating projection 12b in order to limit the angular range of its rotation.

A dynamic seal 18 is disposed at the radial tip of the projection 12b and provides sealing between the projection 12b and the housing 14. A static seal 17 is disposed around the end stop 16, and provides a seal between the end stop 16 and the housing 14, as well as between the shaft 12a and the end stop 16. The arrangement of the seals 17, 18 forms two separated hydraulic fluid chambers 19a, 19b either side of the projection 12b.

The projection 12b features an orifice 20 therethrough which fluidly connects the fluid chambers 19a, 19b. In operation, the fluid chambers 19a, 19b are filled with hydraulic fluid and the rotation of the projection 12b will produce a hydraulic reaction force against the end stop 16 that will force some hydraulic fluid through the orifice 20 and into the adjacent fluid chamber (i.e. in a direction opposite that of the rotation). For instance, if the projection 12b is rotated clockwise in FIG. 1B then the chamber 19b will reduce in volume and the hydraulic fluid therein will be pushed towards the end stop 16. In doing so, there will be a reaction force in the hydraulic fluid against the end stop 16 and the projection 12b that will force some of the hydraulic fluid to pass through the orifice 20 into the chamber 19a. The orifice 20 is configured to provide a suitable restriction to flow of hydraulic fluid therethrough, which damps the rotation of the rotor 12.

During rotation of the rotor 12, the dynamic seal 18 is moved over a surface of the housing 14 and the shaft 12a rotates over static seal 17. Such movement can wear the seals 17, 18 which can cause hydraulic fluid in chambers 19a, 19b to leak past the seals 17, 18 (e.g. see leak paths L in FIG. 1B). Over time, seal wear/damage and continued/increased leakage past seals 17, 18 can reduce the damping performance of the damper 10 and may also result in fluid leaking externally from the damper 10. External fluid leaks from the damper 10 can lead to costly and time consuming removal, maintenance and/or replacement of the damper 10. If the damper 10 is associated with an actuation system for a vehicle, this can cause further costs due to unscheduled maintenance, and thus down time, of the vehicle.

The present disclosure is intended to avoid the damping performance deterioration and external fluid leaks associated with the above prior art design of rotary damper. More specifically, this is achieved by providing an alternative damper construction that removes the need for the hydraulic seals 15b, 17, 18.

SUMMARY

From one aspect, the present disclosure relates to a rotary damper comprising a fixed structure, a rotor configured to rotate about an axis relative to the fixed structure, two opposing bellows, and a damping orifice extending through the rotor or the fixed structure. The two opposing bellows each extend between the rotor and the fixed structure and are attached thereto. The bellows each define a chamber for holding hydraulic fluid and are configured to expand and contract as the rotor rotates. The bellows are also sealingly engaged around the damping orifice, and the damping orifice permits fluid communication between the chambers defined by the bellows.

In an embodiment of the above rotary damper, the bellows are attached to the rotor and/or the fixed structure via a weld, for example, an electron beam weld.

In a further embodiment of any of the above rotary dampers, the rotor includes a shaft extending along the axis and a projection extending radially from the shaft, and the bellows are attached to the projection.

In a further embodiment of any of the above rotary dampers, the rotary damper further comprises a housing that surrounds the rotor and the bellows.

Within the scope of this disclosure, the housing surrounding the rotor may be formed by any suitable number of interconnected parts or portions, and for example, may include a portion that surrounds or encircles the rotor and may additionally have other portion(s), cover(s) and/or end plate(s). Thus, irrespective of whether the other portion(s), cover(s), end plate(s) or portion surrounding/encircling the rotor include the first and second stop members, it is still the housing per se that is to be considered as comprising the first and second stop members.

In a further embodiment of the above rotary damper, a radially inner surface of the housing and/or a radially outer surface of the rotor includes a wear liner thereon. The wear liners comprise a friction reducing lining material, a friction reducing coating and/or a friction reducing surface treatment, for example, a self-lubricating bronze lining material, a PTFE coating, a diamond-coating, and/or a case-hardened surface.

In a further embodiment of the above rotary dampers featuring a housing, the housing comprises first and second stop members circumferentially-spaced from each other relative to the axis of rotation of the rotor. The rotor also comprises a third stop member. The third stop member is configured to engage the first or second stop member in order to limit the rotation of the rotor.

In a further embodiment of any of the above rotary dampers, the rotor and/or the fixed structure includes a bleed valve in fluid communication with the bellows. The bleed valve is configured to allow bleeding of fluid from the bellows and/or filling of the bellows with fluid. In one example, the bleed valve is a bleed screw.

In a further embodiment of any of the above rotary dampers, the bellows comprise stainless steel.

From another aspect, the present disclosure relates to an actuator comprising any of the aforementioned rotary dampers.

From yet another aspect, the present disclosure relates to a control surface actuation system for an aircraft. The system comprises an aircraft control surface and the above actuator operatively connected to the aircraft control surface.

From yet another aspect, the present disclosure relates to a method of damping rotary motion of a rotor. The method comprises attaching two opposing bellows between the rotor and a fixed structure, and configuring the bellows to expand and contract with rotation of the rotor. Each of the bellows defines a chamber for holding hydraulic fluid, and the bellows are sealingly engaged around a damping orifice extending through the rotor or the fixed structure that permits fluid communication between the chambers.

In an embodiment of the above method, the step of attaching the bellows comprises welding the bellows to the rotor and/or the fixed structure, for example, electron beam welding.

In a further embodiment of any of the above methods, the method further comprises limiting the rotation of the rotor by configuring first and second circumferentially-spaced stop members of a housing surrounding the rotor to engage with a third stop member on the rotor.

By "damping orifice" it is meant an orifice that is configured to provide a suitable restriction to hydraulic fluid flow therethrough in order to damp the rotation of the rotor. Such "damping orifices" are well-known in the art, and the specific size, shape and configuration of the orifice will depend on the amount of damping force required for a specific application (as well as other design factors, such as viscosity of hydraulic fluid, as would be apparent to the skilled person). Thus, these do not warrant a detailed discussion in this disclosure.

The damping orifice passing through the rotor or the fixed structure provides a first opening at a first side of the rotor or the fixed structure, and a second opening at a second, opposing side of the rotor or the fixed structure. Thus, when the opposing bellows are sealing engaged around the damping orifice, it is to be understood that one of the bellows is secured around the first opening and the other bellows is secured around the second opening.

By "bellows" it is meant an object or device with concertinaed sides or corrugations along at least a portion of its length that allow it to expand and contract and its volume to increase and decrease accordingly.

By "opposing" it is meant that the two bellows extend in opposing directions such that when the rotor rotates one bellows has a tendency to extend whilst the other once has tendency to contract, and vice versa. For instance, in an embodiment where the bellows circumscribe an annular space, they will extend around opposing circumferential regions of the annular space (for example, either side of a projection on the rotor).

By "sealingly engaged" it is meant that the bellows are engaged around the damping orifice in a manner that is impermeable to hydraulic fluid. In other words, the attachment of the bellows provides a hermetic seal around the damping orifice. This ensures that hydraulic fluid cannot escape from the chambers defined by the bellows via the attachment point between the bellows and the rotor or the fixed structure. As such, the only route for hydraulic fluid leaving the bellows is via the damping orifice.

Electron beam welding is an advantageous attachment method, as it can provide a low heat affected zone around the weld, which can present less distortion, good weld penetration and continuity, unlike other welding methods. However, any other suitable welding or attachment method may be used, such as, for instance, brazing.

BRIEF DESCRIPTION OF DRAWINGS

Some exemplary embodiments of the present disclosure will now be described by way of example only, and with reference to the following drawings in which.

DETAILED DESCRIPTION

Figure 2A:
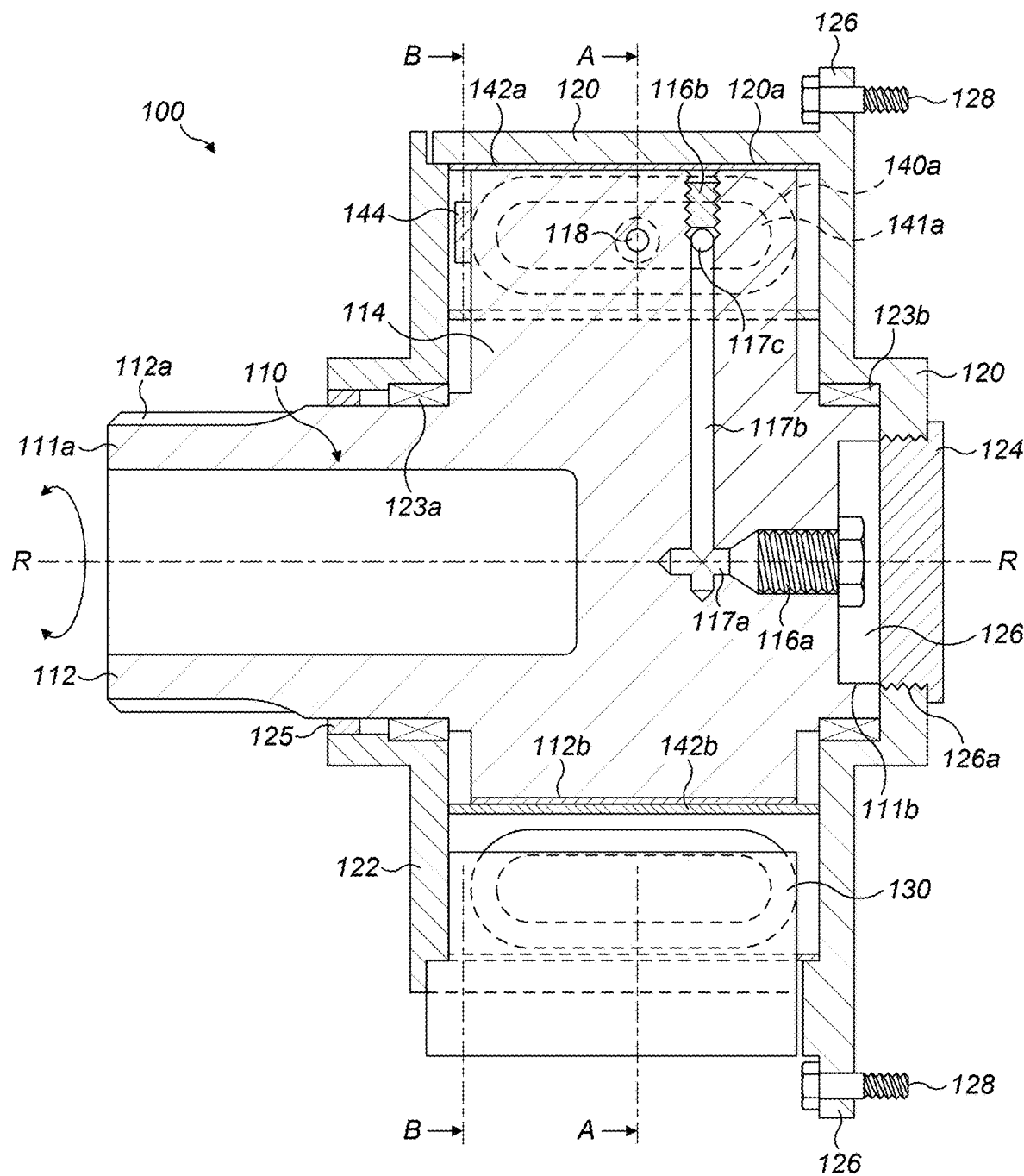
FIG. 2A shows a cross-sectional view of a rotary damper in accordance with embodiments of the present disclosure.
Figure 2B:
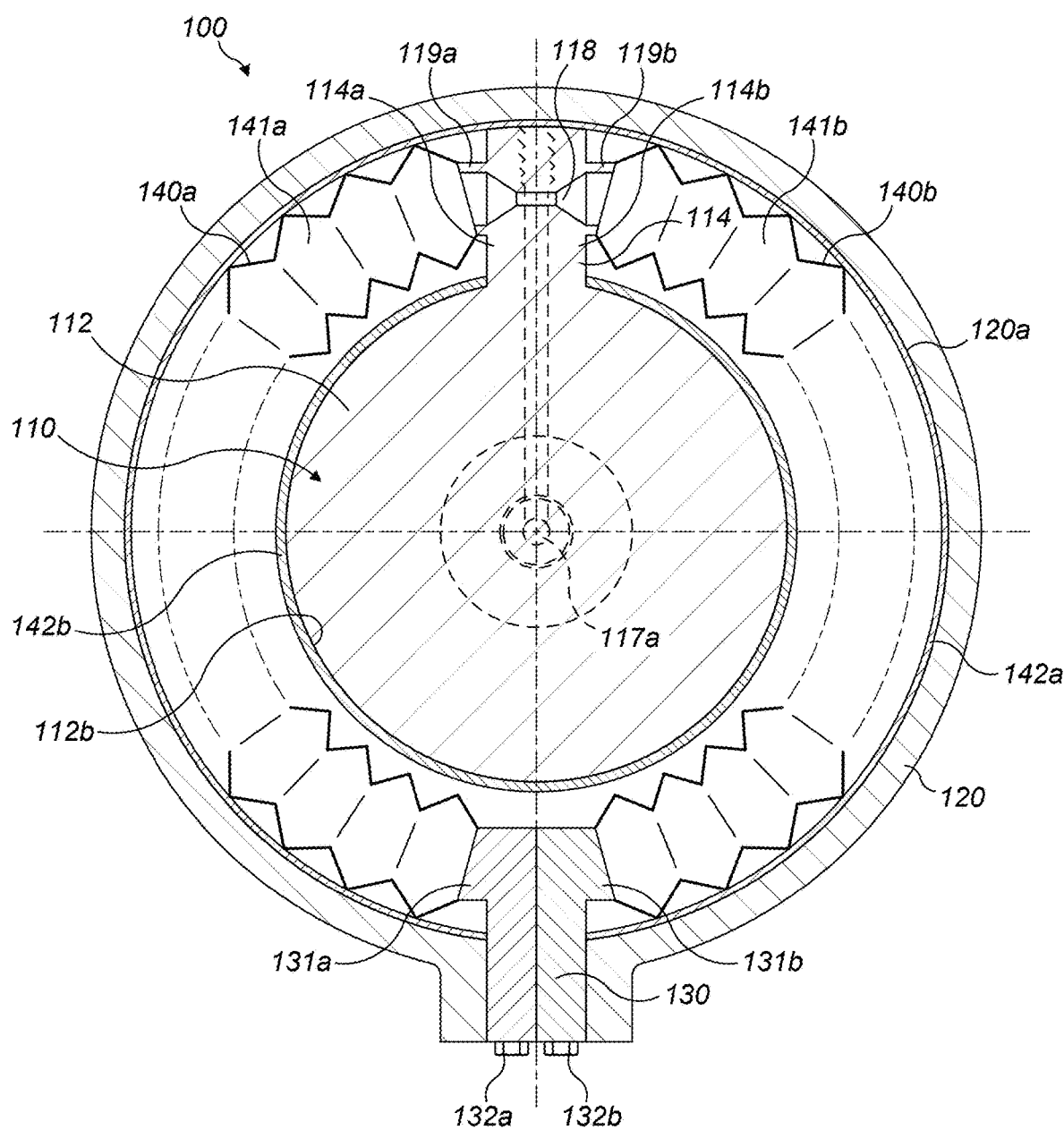
FIG. 2B shows a cross-sectional view taken along line A-A in FIG. 2A.

With reference to FIGS. 2A and 2B, an example of a rotary damper 100 is shown in accordance with the present disclosure. The rotary damper 100 comprises an inner rotor 110 surrounded by an annular outer housing 120.

The rotor 110 comprises a shaft 112 that extends along an axis R-R and is rotatable thereabout and a projection 114 that extends radially from the shaft 112. In the depicted embodiment, the shaft 112 includes a spline 112a at a first axial end 111a of the rotor 110. The spline 112a is for connecting the shaft 112 to a rotating drive, e.g. an actuator, such as a ball screw. In other embodiments, however, the shaft 112 may not have the spline 112a, and may instead be integral with the actuator, or attachable thereto by other suitable means (e.g. gearing or a link arm). A damping orifice 118 extends through the circumferential thickness of projection 114. Connecting flanges 119a, 119b extend circumferentially from the damping orifice 118 from a respective, first and second circumferential side 114a, 114b of the projection 114.

The housing 120 includes a front cover 122 and cover plate 124 attached thereto e.g. via bolts (not shown). The housing 120 also includes an aperture 126 therethrough, which is covered by the cover plate 124, as well as a radially extending flange 126 that is configured to receive mounting bolts 128 for mounting the damper 100 to an external structure, for example, a vehicle (not shown). The rotor 110 is supported for rotation within the housing 120 and front cover 122 by bearings 123a, 123b. An excluder shield 125 is placed around the shaft 112 to provide a seal between the front cover 122 and the shaft 112 to protect the bearing 123a.

A fixed structure 130 protrudes radially into the housing 120 and is attached thereto e.g. via bolts (not shown).

A first bellows 140a is sealingly engaged to the connecting flange 119a at the first circumferential side 114a of the projection 114 and extends circumferentially around the shaft 112 to a first circumferential side 130a of the fixed structure 130, where it is also attached thereto via a connecting flange 131a. Likewise, a second bellows 140b is sealingly fixed to the connecting flange 119b at the second circumferential side 114b of the projection 114 and extends circumferentially around the shaft 112 to a second circumferential side 130b of the fixed structure 130, where it is also attached thereto via a connecting flange 131b. The bellows 140a, 140b are sealingly fixed to the projection 114 such that the hollow interiors thereof sealingly surround and are in fluid communication with the damping orifice 118. In this manner, the bellows 140a 140b are only in fluid communication with each other via the damping orifice 118 and any fluid passing through the damping orifice 118 will be confined to the bellows 140a, 140b.

The depicted bellows 140a, 140b are hollow structures with a rounded rectangular cross-section that define chambers 141a, 141b for holding hydraulic fluid. The bellows 140a, 140b include concertinas or corrugations along at least a portion of their lengths. The concertinas or corrugations along at least a portion of the length of the bellows 140a, 140b allows them to expand and contract lengthways, such that they can allow for rotation of the rotor 110 (as explained in more detail below with regard to the operation of the rotary damper 100). Within the scope of this disclosure, however, any suitable cross-section of the bellows 140a, 140b can be used (e.g. round, elliptical, rectangular etc.). Moreover, any suitable bellows 140a, 140b configuration can be used. For instance, the degree and number of concertinas/corrugations and the materials used to make the bellows 140a, 140b can be suitably selected for the particular application, and/or to provide minimal (or a desired amount) of resistance to rotor rotation.

In any event, the bellows 140a, 140b are made from a material that is impermeable to the hydraulic fluid to be used. In the depicted embodiment, the bellows 140a, 140b are made from a stainless steel. However, the skilled person will be aware of other suitable materials that may be used within the scope of this disclosure (e.g. depending on the hydraulic fluid to be used). Due to the impermeable nature of the bellows 140a, 140b and their fixed attachment to the projection 114 and the fixed structure 130, hydraulic fluid within the rotary damper 100 is fully confined to the bellows 140a, 140b and thus does not leak into the space between the rotor 110 and the housing 120.

In the depicted embodiment, the bellows 140a, 140b are sealingly fixed to the connection flanges 119a, 119b, 131a, 131b via welding. In a particular embodiment, the bellows 140a, 140b are electron beam welded to the connection flanges 119a, 119b, 131a, 131b. However, the bellows 140a, 140b may be sealingly fixed to the connection flanges 119a, 119b in any suitable manner (e.g. by brazing instead). In any event, the sealing fixture of the bellows 140a, 140b to the projection 114 and to the fixed structure 130 is configured to provide a bond that is impermeable to the hydraulic fluid. This prevents hydraulic fluid from leaking into the space between the rotor 110 and the housing 120.

Although connection flanges 119a, 119b, 131a, 131b are provided in the depicted embodiment to provide a larger area for bellows attachment, in other embodiments, the connection flanges 119a, 119b, 131a, 131b may be omitted.

The rotor 110 also comprises a first passage 117a that opens at a second axial end 111b thereof, and extends axially through the rotor 110. The first passage 117a is fluidly connected to a second passage 117b that extends radially through the projection 114, which is fluidly connected to both the chambers 141a, 141b of the bellows 140a, 140b via a cross channel 117c passing through the projection 114. In this manner, passages 117a, 117b are fluidly connected to the bellows 140a, 140b via the cross channel 117c. The opening of the first passage 117a at the second axial end 11b of the rotor 110 can be used as an injection point to fill the bellows chambers 141a, 141b with hydraulic fluid during assembly or maintenance of the rotary damper 100. As shown in FIG. 2A, the cross channel 117c is axially offset from the damping orifice 118. Thus, the cross channel 117c opens into the bellows 140a, 140b separately from the damping orifice 118, such that is does not interfere with the operation thereof.

The depicted example of passages 117a, 117b, 117c is only one particular example, and any other suitable combination of passages may be used within the scope of the present invention. For example, individual passages may extend from passage 117a to each bellows 140a, 140b respectively, rather than the passage 117b connecting to the bellows 140a, 140b via a cross channel 117c.

A plug 116a (e.g. a bleed screw/nipple) is threadably engaged with the first passage 117a and can be used to seal the first passage 117a to prevent hydraulic fluid escaping the first passage 117a after filling and during use of the rotary damper 100. The removal and/or partial removal of the plug 116a from the first passage 117a (e.g. by turning or unscrewing the plug 116a in the first passage 117a) can also be used as a bleed point during or after the filling procedure (i.e. plug 116a can be used as a bleed valve).

Another plug 116b (e.g. another bleed screw/nipple) extends radially inwards from the radial tip of the projection 114 and is threadably engaged with the second passage 117b to seal the passage 117b from the exterior of the rotor 110. Thus, in the same manner as the first passage 117a and plug 116a, the second passage 117b and plug 116b can be used as an additional fill/bleed point, if necessary.

An aperture 126 in the housing 120 is axially aligned with the plug 116a in order to allow access thereto. Aperture 126 features a threaded surface 126a that threadably receives a removable cap 124 (e.g. a screw cap). In this manner, the cap 124 can seal the exterior of the rotary damper 100 from the exterior of the housing 120, but can also be removed to allow assembly or maintenance activities to be conducted on the rotary damper 100 easily.

The fixed structure 130 also comprises radially extending passages (not shown) therein, that are in fluid communication with respective ones of the bellows 140a, 140b. As shown in FIG. 2B, plugs 132a, 132b (e.g. bleed screws/nipples) extend radially inwards into respective ones of the passages to seal the passages from the exterior of the housing 120. Plugs 132a, 132b can also be used as additional fill/bleed points, if necessary. The plugs 132a, 132b protrude radially outwards from the exterior of the fixed structure 130 and the housing 120, and therefore can be used to bleed/fill the bellows 140a, 140b even when the rotary damper 100 is fully assembled. In other embodiments, however, the plugs 132a, 132b may be omitted.

The operation of the rotary damper 100 will now be described. As discussed above, the rotary damper 100 will be filled with hydraulic fluid during assembly, such that the bellows 140a, 140b are filled with hydraulic fluid for operation of the rotary damper 100. The shaft 112 is operatively connected to a rotary drive that is to be damped (e.g. from an actuator), and rotation of the shaft 112 around axis R-R will rotate the projection 114 around the inner volume of the housing 120. As the bellows 140a, 140b are attached to the projection 114 they will expand and contract respectively, as the projection 114 rotates around axis R-R within the housing 120. For instance, if projection 114 rotates clockwise in FIG. 2B, the bellows 140a will be expanded lengthwise and the bellows 140b will be compressed lengthwise. When the bellows 140b compresses, the hydraulic fluid therein will be compressed between the projection 114 and the fixed structure 130. This will generate a reaction force against the fixed structure 130 that will drive a proportion of the hydraulic fluid from the bellows 140b into the bellows 140a through the damping orifice 118. As discussed above in relation to the example of FIGS. 1A and 1B, the movement of hydraulic fluid through the damping orifice 118 absorbs a proportion of the rotational energy driving the rotor 110, and thus damps the rotational motion.

Figure 1A:
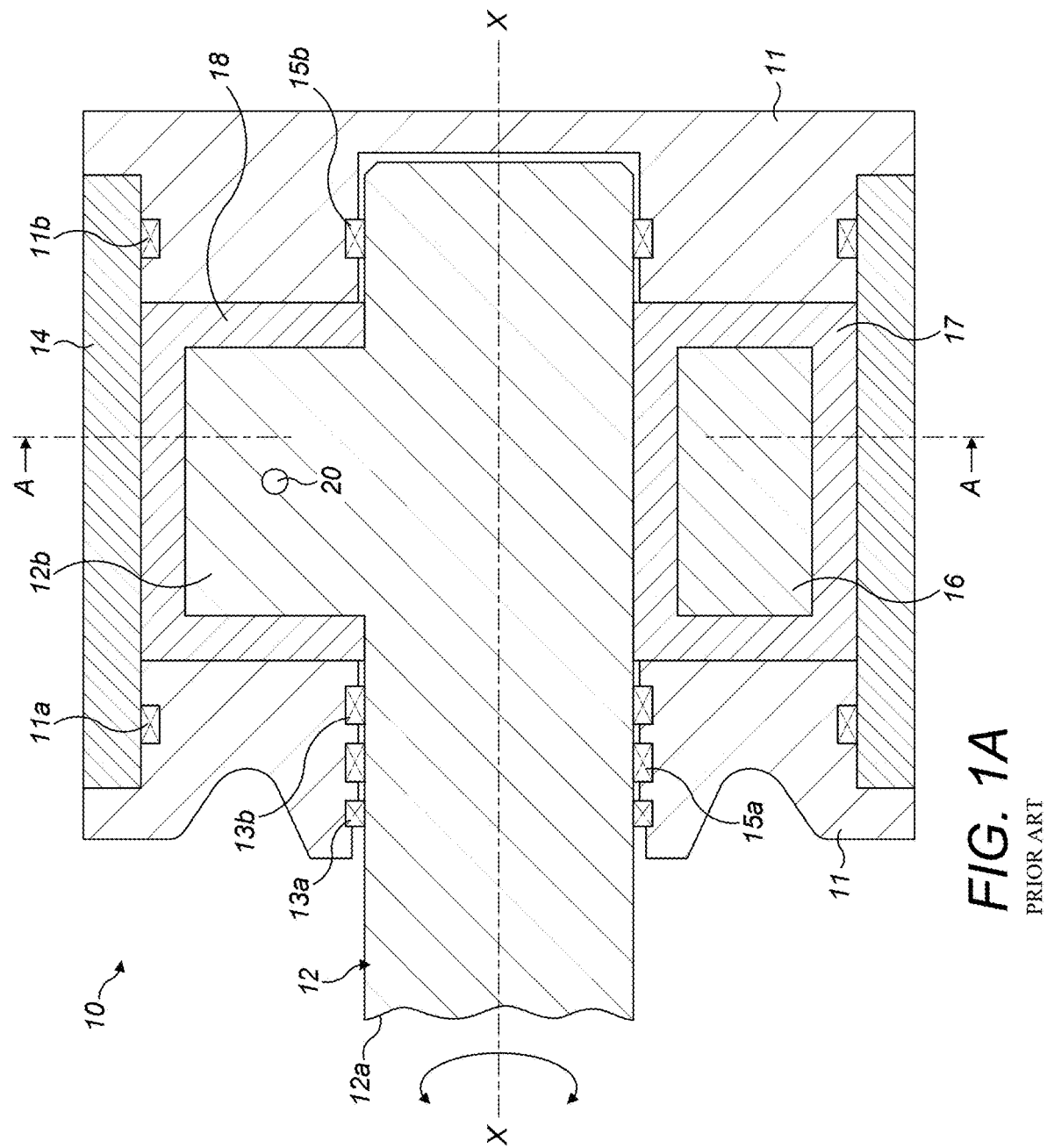
FIG. 1A shows a cross-sectional view through an example prior art rotary damper.
Figure 1B:
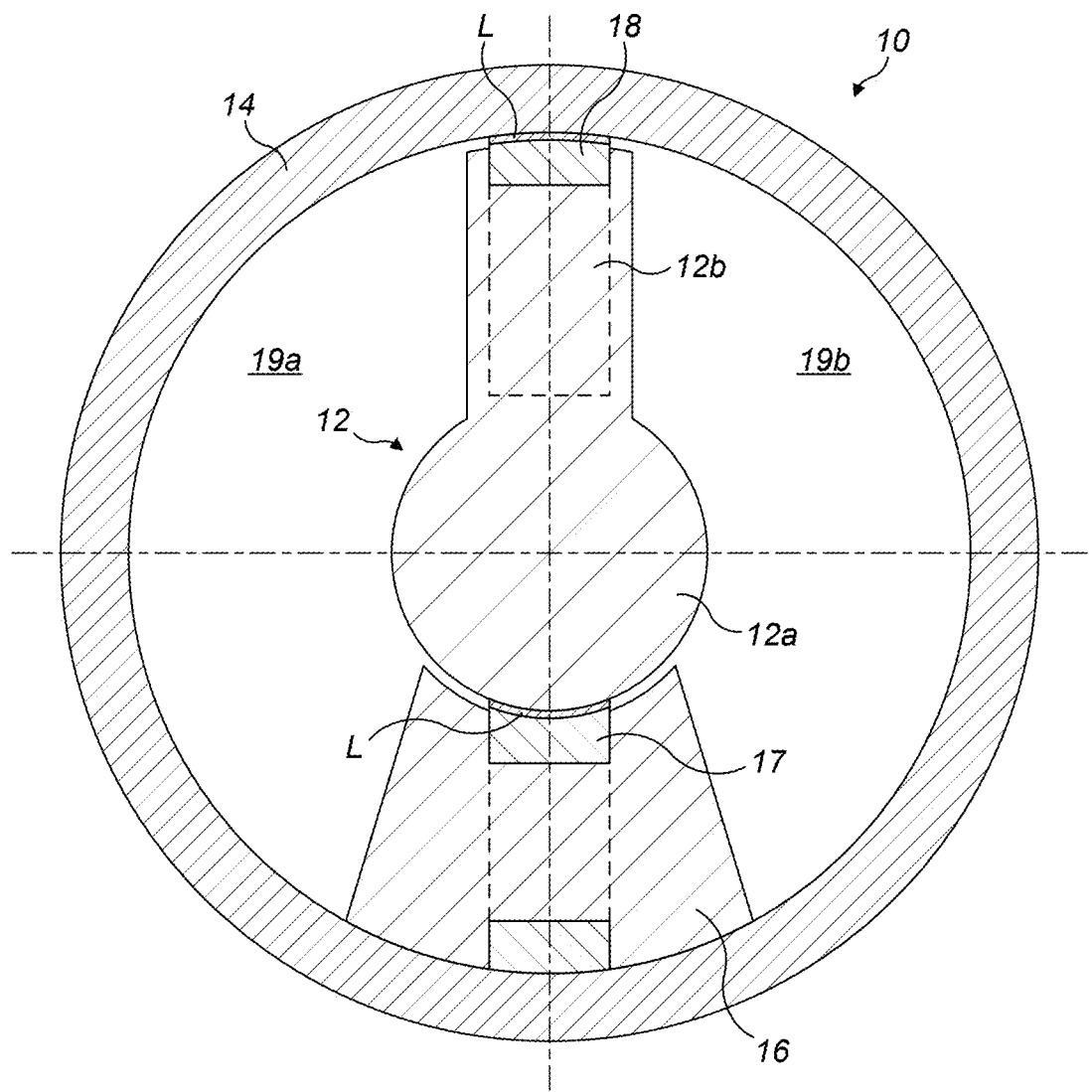
FIG. 1B shows a cross-sectional view taken along line A-A in FIG. 1A.

It is to be appreciated that by using the bellows 140a, 140b to confine the hydraulic fluid in the rotary damper 100, rather than the fluid chambers 19a, 19b and seals 17, 18 of the example of FIGS. 1A and 1B, the potential fluid leakage problems and negative implications associated therewith can be avoided.

It is also to be appreciated that the damping orifice 118 need not pass through the rotor 110 such as in the depicted embodiment, as the advantages of the present disclosure may equally be realised in alternative embodiments where the damping orifice 118 passes through the fixed structure 130 instead. In such embodiments, the bellows 140a, 140b would be sealingly engaged around the damping orifice 118 via the attachment to the fixed structure 130 instead of the attachment to the rotor 110.

In the depicted embodiment, both the radially inner surface 120a of the housing 120 and the radially outer surface 112b of the shaft 112 include wear liners 142a, 142b. The wear liners 142a, 142b are configured to limit the friction caused due to contact between the bellows 142a, 142b and the radially inner and outer surfaces 120a, 112b of the housing 120 and the shaft 112. The wear liners 142a, 142b may be provided by any suitable friction reducing lining material, coating or surface treatment. Specific examples include a self-lubricating bronze lining material (e.g. oil impregnated or graphite impregnated bronze), a PTFE coating, a diamond-based coating or a hardening treatment (e.g. case-hardening).

Figure 3:
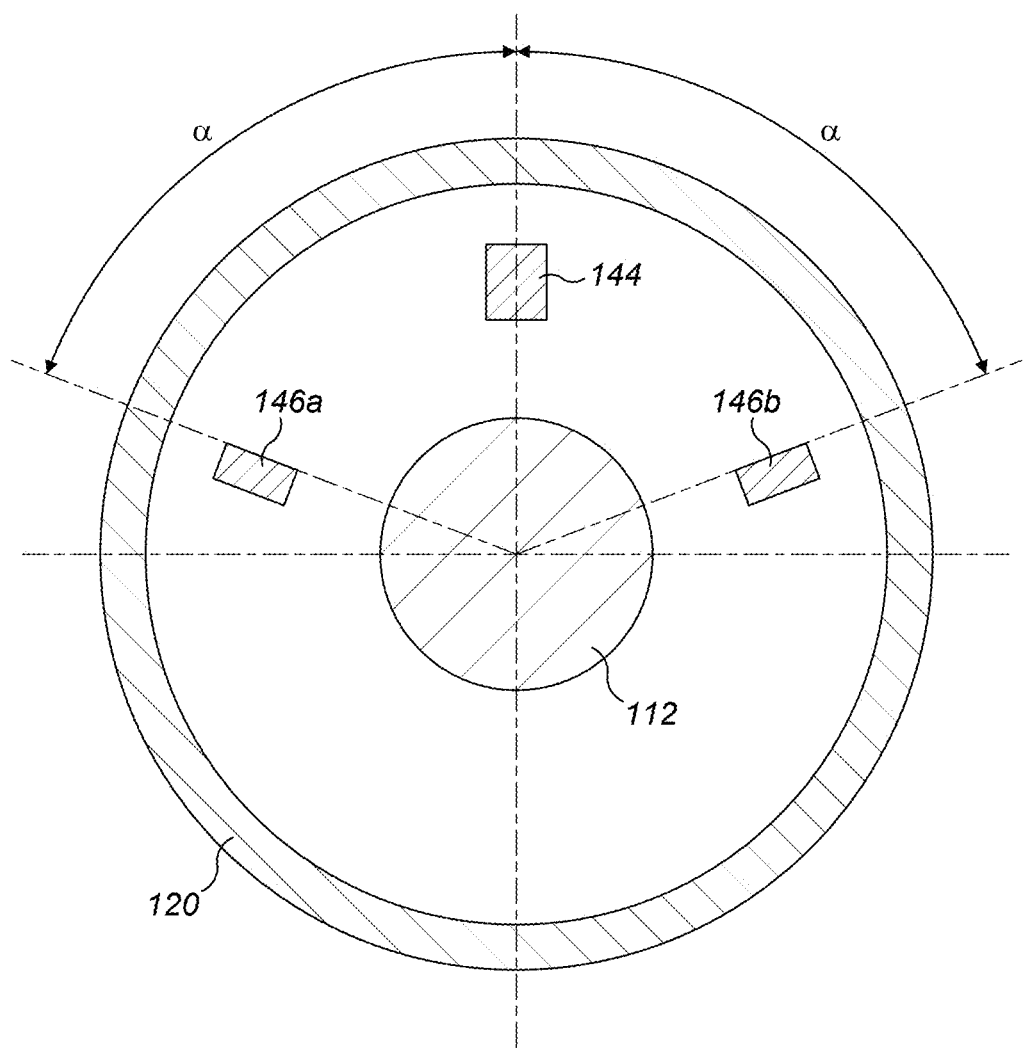
FIG. 3 shows a cross-sectional view taken along line B-B in FIG. 2A.

As shown in FIGS. 2A and 3, the rotor 110 comprises a stop member 144 that protrudes axially from the projection 114, and the front cover 122 comprises two stop members 146a, 146b that protrude axially therefrom and are circumferentially spaced apart relative to the axis R-R. As shown in FIG. 3, the stop member 144 engages with the stop members 146a, 146b during rotation of the projection 114 in order to limit the angular range α of rotation of the rotor 110. In this manner, the stop members 144, 146a. 146b will prevent over rotation of the rotor 110 and protect the rotary damper 100 from damage. For instance, in the event of an actuator overload, limiting the rotation of the rotary damper 100 can protect the bellows 140a, 140b from rupturing or breaking away from their attachment points. As will be understood by the skilled person, the angular range α of rotation permitted can be adjusted by moving the stop members 146a, 146b to be more or less circumferentially spaced apart relative to the axis R-R.

Figure 4:
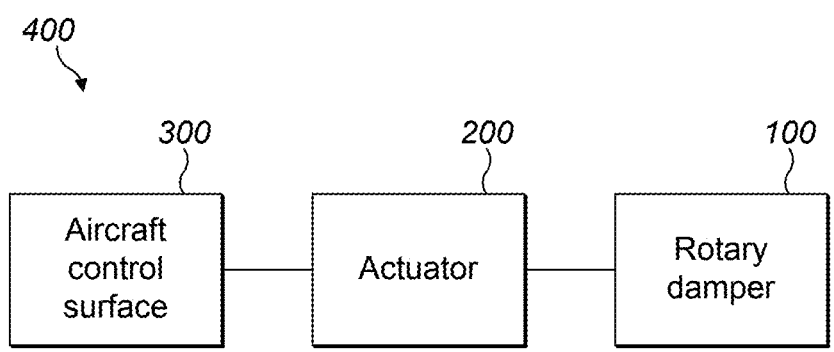
FIG. 4 shows an example of an aircraft control surface actuation system in accordance with embodiments of the present disclosure.

FIG. 4 shows an exemplary use of the rotary damper 100. Specifically, FIG. 4 shows the rotary damper 100 being used as part of a control surface actuation system 400 for an aircraft. In this example, the rotary damper 100 is operatively connected to (or is an integral part of) an actuator 200 that is operatively connected to an aircraft control surface 300. The actuator 200 is actuated in order to drive the aircraft control surface 300, as in known in the art. In this manner, the rotary damper 100 will damp rotatory motion of the actuator 200 in order to damp the movements of the aircraft control surface 300. As will be appreciated by the skilled person, any suitable type of actuator could be used, for instance, a rotary actuator or a linear actuator, such as a rack and pinion actuator or a ball screw. Any suitable operative connection(s) between the actuator 200, the rotary damper 100 and/or the control surface 300 may also be used within the scope of this disclosure, for instance, link arms, geared connections or integral connections. Of course, as discussed in the background section above, use in a control surface actuation system for an aircraft is only one exemplary application of the rotary damper 100, and any other suitable application, as would be apparent to the skilled person, is envisaged within the scope of this disclosure.

The invention claimed is:

1. A rotary damper comprising:
 a housing;
 a fixed structure connected to the housing;
 a rotor configured to rotate about an axis (R-R) relative to the fixed structure and including a projection that extends outwardly therefrom;
 two opposing bellows each extending between and attached to both the rotor and the fixed structure, wherein the bellows each define a chamber for holding hydraulic fluid and are configured to expand and contract as the rotor rotates;
 a damping orifice extending through the projection of the rotor such that fluid on one side of the projection can pass through the projection to another side of the projection as the projection rotates due to rotation of the rotor,
 wherein the bellows are sealingly engaged around the damping orifice and the damping orifice permits fluid communication between the chambers defined by the bellows;
 wherein the two opposing bellows are only in fluid communication with each other via the damping orifice and any fluid passing through the damping orifice is confined to the two opposing bellows;
 wherein the damping orifice comprises:
  a first opening at a first side of the rotor or the fixed structure;
  a second opening at a second opposing side of the rotor or the fixed structure; and
  a restriction between the first and second openings configured to restrict hydraulic fluid flow therethrough in order to damp the rotation of the rotor; and
 wherein the housing surrounds the rotor and the bellows, wherein the housing comprises: first and second stop members circumferentially-spaced from each other relative to the axis (R-R) of rotation of the rotor;
 wherein the rotor comprises a third stop member, wherein the third stop member is configured to engage the first or second stop member in order to limit the rotation of the rotor.

2. The rotary damper of claim 1, wherein the bellows are attached to the rotor and/or the fixed structure via a weld, for example, an electron beam weld.

3. The rotary damper of claim 1, wherein the rotor includes a shaft extending along the axis (R-R) and a projection extending radially from the shaft, and the bellows are attached to the projection.

4. The rotary damper of claim 1, wherein a radially inner surface of the housing and/or a radially outer surface of the rotor includes a wear liner thereon.

5. The rotary damper of claim 4, wherein the wear liner comprises:
- a friction reducing lining material; and
- a friction reducing coating.

6. The rotary damper of claim 5, further comprising:
- a friction reducing surface treatment selected from one of: a self-lubricating bronze lining material; a PTFE coating; a diamond-coating; and a case-hardened surface.

7. The rotary damper of claim 1, wherein the rotor or the fixed structure includes a bleed valve in fluid communication with the bellows,
- wherein the bleed valve is configured to allow bleeding of fluid from the bellows or filling of the bellows with hydraulic fluid.

8. The rotary damper of claim 7, wherein the bleed valve is a bleed screw or a bleed nipple.

9. The rotary damper of claim 1, wherein the bellows comprise stainless steel.

10. An actuator comprising:
- the rotary damper of claim 1.

11. A control surface actuation system for an aircraft comprising:
- the actuator that includes a rotary damper of claim 1; and
- an aircraft control surface;
- wherein the actuator is operatively connected to the aircraft control surface.

\* \* \* \* \*